US012782014B2

(12) United States Patent
Aly et al.

(10) Patent No.: US 12,782,014 B2
(45) Date of Patent: Nov. 3, 2026

(54) TUBE JOINT FOR HVAC SYSTEM

(71) Applicant: Tyco Fire & Security GmbH, Neuhausen am Rheinfall (CH)

(72) Inventors: Amr Aly, Wichita, KS (US); Elmer Wayne Romero, Oxford, KS (US); D'Marcus Letrey Garrett, Wichita, KS (US); Xianjin Cheng, Andover, KS (US)

(73) Assignee: Johnson Controls Light Commercial IP GmbH, Stuttgart (DE)

( * ) Notice: Subject to any disclaimer, the term of this patent is extended or adjusted under 35 U.S.C. 154(b) by 149 days.

(21) Appl. No.: 18/441,867

(22) Filed: Feb. 14, 2024

(65) Prior Publication Data

US 2024/0271838 A1 Aug. 15, 2024

Related U.S. Application Data

(60) Provisional application No. 63/445,946, filed on Feb. 15, 2023.

(51) Int. Cl.
*F25B 41/40* (2021.01)
*F16L 13/08* (2006.01)

(52) U.S. Cl.
CPC .............. *F25B 41/40* (2021.01); *F16L 13/08* (2013.01)

(58) Field of Classification Search
CPC ............ F25B 41/40; F25B 39/02; F16L 13/08
USPC ............................................... 285/18, 27, 29
See application file for complete search history.

(56) References Cited

U.S. PATENT DOCUMENTS 1,025,759 A * 5/1912 McCluskey ........... F16L 37/252 285/27
1,311,145 A * 7/1919 Smith ................... F16L 37/252 285/391
1,385,157 A * 7/1921 Smith ..................... F16L 15/08 285/15
1,904,967 A * 4/1933 Barder ................. B23K 33/006 285/283
1,968,507 A * 7/1934 Smith .................... A23G 9/228 62/200

(Continued)

FOREIGN PATENT DOCUMENTS

CN 207406963 U 5/2018
CN 208935622 U 6/2019

(Continued)

*Primary Examiner* — Ljiljana V. Ciric
(74) *Attorney, Agent, or Firm* — Jeremy Hargis

(57) ABSTRACT

A suction tube for a heat exchanger system includes a first tube segment and a second tube segment. The first tube segment includes a first end and a second end, wherein the first end is configured to fluidly couple to a heat exchanger of the heat exchanger system, and wherein the second end comprises a first alignment feature. The second tube segment includes an additional first end and an additional second end, wherein the additional first end is configured to couple to the second end of the first tube segment, the additional second end is configured to extend through a tubing access panel, and the additional first end comprises a second alignment feature configured to align with the first alignment feature during assembly of the heat exchanger system to align the additional second end of the second tube segment with an opening of the tubing access panel.

14 Claims, 12 Drawing Sheets

(56) References Cited

U.S. PATENT DOCUMENTS

| | | | | | |
|---|---|---|---|---|---|
| 2,230,842 | A * | 2/1941 | May | F25B 39/02<br>62/203 |
| 2,306,772 | A * | 12/1942 | Benson | F25B 39/02<br>165/169 |
| 2,341,924 | A * | 2/1944 | Kruck | F25D 29/005<br>62/226 |
| 2,355,407 | A * | 8/1944 | Wyss | F16L 37/248<br>285/376 |
| 2,377,060 | A * | 5/1945 | White | A47L 9/1427<br>285/27 |
| 2,773,707 | A * | 12/1956 | Fraser | F16L 37/252<br>285/414 |
| 2,813,664 | A * | 11/1957 | Punte | B65D 25/42<br>220/601 |
| 3,061,338 | A * | 10/1962 | Clark | H02G 3/083<br>411/968 |
| 3,193,309 | A * | 7/1965 | Morris | H01R 13/6277<br>285/321 |
| 3,287,031 | A * | 11/1966 | Simmons | H01R 13/6456<br>403/201 |
| 3,625,548 | A * | 12/1971 | Boehm | F16L 37/20<br>285/27 |
| 3,638,970 | A * | 2/1972 | Sandquist | F16L 37/10<br>285/123.1 |
| 3,831,954 | A * | 8/1974 | Longfellow | F16L 21/03<br>285/918 |
| 3,832,075 | A * | 8/1974 | Arai | F21V 5/048<br>403/14 |
| 3,948,545 | A * | 4/1976 | Bonds | E21B 33/038<br>285/391 |
| 3,950,014 | A * | 4/1976 | Doubleday | A47L 9/242<br>285/260 |
| 4,004,709 | A * | 1/1977 | Simkus | B65D 39/084<br>220/601 |
| 4,026,581 | A * | 5/1977 | Pasbrig | F16L 37/0985<br>285/24 |
| 4,039,208 | A * | 8/1977 | Pernet | E21B 7/128<br>285/317 |
| 4,077,657 | A * | 3/1978 | Trzeciak | E21B 7/067<br>175/320 |
| 4,082,319 | A * | 4/1978 | Berger | F16L 19/0206<br>285/31 |
| 4,113,289 | A * | 9/1978 | Wagner | F01N 13/1805<br>285/322 |
| 4,148,351 | A * | 4/1979 | Epps | B22D 11/04<br>164/418 |
| 4,201,407 | A * | 5/1980 | Paterick | F16L 37/084<br>285/305 |
| 4,239,325 | A * | 12/1980 | Tyson | H01R 13/64<br>439/314 |
| 4,398,756 | A * | 8/1983 | Duret | E21B 17/042<br>285/334 |
| 4,505,017 | A * | 3/1985 | Schukei | F16L 55/163<br>29/523 |
| 4,603,886 | A * | 8/1986 | Pallini, Jr. | F16L 37/088<br>285/308 |
| 4,611,662 | A * | 9/1986 | Harrington | E21B 17/046<br>166/242.6 |
| 4,611,829 | A * | 9/1986 | Hughes | F16L 27/00<br>285/308 |
| 4,613,162 | A * | 9/1986 | Hughes | E21B 33/038<br>285/376 |
| 4,620,590 | A * | 11/1986 | Koisuka | F28D 1/0477<br>165/DIG. 497 |
| 4,629,226 | A * | 12/1986 | Cassel | F16L 21/065<br>285/403 |
| 4,753,458 | A * | 6/1988 | Case | F16L 37/107<br>285/379 |
| 4,902,049 | A * | 2/1990 | Umehara | F16L 13/161<br>29/451 |
| 5,176,406 | A * | 1/1993 | Straghan | E21B 17/046<br>285/330 |
| 5,214,847 | A * | 6/1993 | Aoki | B21D 53/085<br>29/890.052 |
| 5,338,072 | A * | 8/1994 | Bitter | F16L 13/08<br>228/198 |
| 5,437,650 | A * | 8/1995 | Larkin | A61M 39/1011<br>604/905 |
| 5,462,311 | A * | 10/1995 | Cipolla | A47L 9/244<br>285/298 |
| 5,507,733 | A * | 4/1996 | Larkin | A61M 39/1011<br>604/905 |
| 5,782,500 | A * | 7/1998 | Mate | F16L 19/02<br>285/388 |
| 5,850,743 | A * | 12/1998 | Dreiman | F04B 39/0072<br>220/601 |
| 5,875,976 | A * | 3/1999 | Nelson | A61M 5/30<br>285/391 |
| 5,950,744 | A * | 9/1999 | Hughes | E21B 17/046<br>166/242.6 |
| 6,089,624 | A * | 7/2000 | Cassel | F01N 13/1805<br>285/424 |
| 6,199,921 | B1 * | 3/2001 | Cassel | F01N 13/1844<br>285/424 |
| 6,394,504 | B1 * | 5/2002 | Brummans | F16L 37/0985<br>285/137.11 |
| 6,405,542 | B1 * | 6/2002 | Matta | F25B 41/40<br>62/509 |
| 6,539,745 | B1 * | 4/2003 | Harmer | B21D 51/30<br>220/601 |
| 6,908,121 | B2 * | 6/2005 | Hirth | E21B 17/043<br>285/305 |
| 7,178,515 | B2 * | 2/2007 | Carpenter | F41B 11/52<br>124/49 |
| 7,213,655 | B2 * | 5/2007 | Parrott | E21B 17/042<br>285/391 |
| 7,566,079 | B1 * | 7/2009 | Callahan | F16L 37/113<br>285/314 |
| 7,988,200 | B2 * | 8/2011 | Krywitsky | F16L 37/113<br>285/91 |
| 8,105,054 | B2 * | 1/2012 | Oo | F04C 29/02<br>417/372 |
| 8,360,284 | B2 * | 1/2013 | Carta | B05B 11/0044<br>222/207 |
| 9,261,214 | B2 * | 2/2016 | Guest | F16L 37/0927 |
| 9,267,547 | B2 * | 2/2016 | Degner | F16L 37/23 |
| 10,130,804 | B2 * | 11/2018 | Witt | A61M 39/10 |
| 10,544,631 | B2 * | 1/2020 | Reinecke | E21B 17/021 |
| 10,857,344 | B2 * | 12/2020 | Witt | A61M 39/1011 |
| 11,236,951 | B2 * | 2/2022 | Yu | F28F 1/325 |
| 11,802,643 | B2 * | 10/2023 | Kluss | F16L 37/0985 |
| 11,946,573 | B2 * | 4/2024 | Salunkke | F24F 1/28 |
| 12,092,241 | B2 * | 9/2024 | Hamadate | F25B 41/24 |
| 12,320,459 | B2 * | 6/2025 | Ferkel | B21D 7/063 |
| 12,345,453 | B2 * | 7/2025 | Ohno | F25B 41/42 |
| 12,553,649 | B2 * | 2/2026 | Kim | F25B 13/00 |
| 2009/0250922 | A1 * | 10/2009 | Rossman | F16L 25/14<br>239/289 |
| 2010/0148490 | A1 * | 6/2010 | Bobenhausen | F16L 33/02<br>285/24 |
| 2016/0109317 | A1 * | 4/2016 | Gilman | G01L 19/0092<br>29/890.035 |
| 2021/0003290 | A1 * | 1/2021 | Ingram | F24F 13/32 |
| 2022/0316633 | A1 | 10/2022 | Corcoran et al. | |
| 2022/0316754 | A1 * | 10/2022 | Jayarathne | F24F 1/14 |
| 2022/0349501 | A1 * | 11/2022 | Hamadate | B23K 33/006 |
| 2023/0175617 | A1 * | 6/2023 | Salunkke | F24F 1/28<br>62/89 |
| 2023/0323992 | A1 * | 10/2023 | Ferkel | B21D 7/063<br>285/18 |
| 2024/0271838 | A1 * | 8/2024 | Aly | F16L 13/08 |

FOREIGN PATENT DOCUMENTS

| | | | | |
|---|---|---|---|---|
| EP | 1006309 | A1 * | 6/2000 | F16L 43/008 |
| EP | 4745442 | A1 * | 5/2026 | F25B 41/40 |
| GB | 2251046 | A * | 6/1992 | E21B 17/046 |

(56) References Cited

FOREIGN PATENT DOCUMENTS

| | | | | | |
|---|---|---|---|---|---|
| WO | WO-9619692 | A1 * | 6/1996 | .............. | F16L 25/10 |
| WO | WO-2018035614 | A1 * | 3/2018 | ............ | F28F 9/0256 |
| WO | 2022212221 | A1 | 10/2022 | | |

* cited by examiner

TUBE JOINT FOR HVAC SYSTEM

CROSS REFERENCE TO RELATED APPLICATIONS

This application claims priority from and the benefit of U.S. Provisional Application No. 63/445,946, entitled "TUBE JOINT FOR ALIGNING HVAC TUBES," filed Feb. 15, 2023, which is hereby incorporated by reference in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The present disclosure relates generally to heating, ventilation, and/or air conditioning (HVAC) systems. A wide range of applications exist for HVAC systems. For example, residential, light commercial, commercial, and industrial systems are used to control temperatures and air quality in residences and buildings. Such systems often may perform heating and/or cooling functions. Very generally, these systems operate by implementing a thermal cycle in which fluids are heated and cooled to provide a desired temperature in a controlled space, such as within a residence or building. For example, a heat exchanger may place a fluid in a heat exchange relationship with an air flow to enable heat transfer between the fluid and the air flow in order to condition the air flow. The conditioned air flow may then be directed into the controlled space to condition the controlled space. Similar systems are used for vehicle heating and cooling and for general refrigeration. Typically, heat exchangers employed by HVAC systems may be in fluid communication with other HVAC equipment, such as a compressor, via one or more tubes or conduits to deliver a fluid to and from the heat exchanger. For example, an evaporator may be in fluid communication with a compressor via a suction tube and in fluid communication with an expansion valve via a liquid tube. It is now recognized that improvements associated with a connection between a heat exchanger and a conduit delivering a fluid to the heat exchanger, and/or a connection between a heat exchanger and a conduit discharging working fluid from the heat exchanger are desirable.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a suction tube for a heat exchanger system includes a first tube segment and a second tube segment. The first tube segment includes a first end and a second end, wherein the first end is configured to fluidly couple to a heat exchanger of the heat exchanger system, and wherein the second end comprises a first alignment feature. The second tube segment includes an additional first end and an additional second end, wherein the additional first end is configured to couple to the second end of the first tube segment, the additional second end is configured to extend through a tubing access panel, and the additional first end comprises a second alignment feature configured to align with the first alignment feature during assembly of the heat exchanger system to align the additional second end of the second tube segment with an opening of the tubing access panel.

In an embodiment, a heat exchanger system includes a housing comprising a plurality of sides that collectively define an interior volume of the housing, wherein a first side of the plurality of sides comprises a tubing access panel and a heat exchanger disposed within the housing and comprising a plurality of heat exchange tubes configured to circulate a working fluid therethrough to place the working fluid in a heat exchange relationship with an additional fluid directed across the plurality of heat exchange tubes. The heat exchanger includes a suction tube configured to fluidly couple the plurality of heat exchange tubes to a compressor disposed downstream of the heat exchanger system relative to a flow direction of the working fluid through the heat exchanger. The suction tube includes a first tube segment comprising a first alignment feature and a second tube segment comprising a second alignment feature, wherein the first alignment feature and the second alignment feature are configured to align with one another to establish a target orientation of the second tube segment through an opening of the tubing access panel.

In an embodiment, a heating, ventilation, and air conditioning (HVAC) system includes a compressor configured to pressurize a working fluid and direct the working fluid through a vapor compression circuit and a heat exchanger disposed along the vapor compression circuit. The heat exchanger includes a suction tube configured to receive the working fluid from the heat exchanger and direct the working fluid toward the compressor. The suction tube includes a first tube segment comprising a first end and a second end, wherein the first end is configured to fluidly couple to the heat exchanger, and the second end comprises a first alignment feature, and a second tube segment comprising an additional first end and an additional second end, wherein the additional first end comprises a second alignment feature configured to align with the first alignment feature of the first tube segment to establish a target orientation of the second tube segment relative to the first tube segment.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
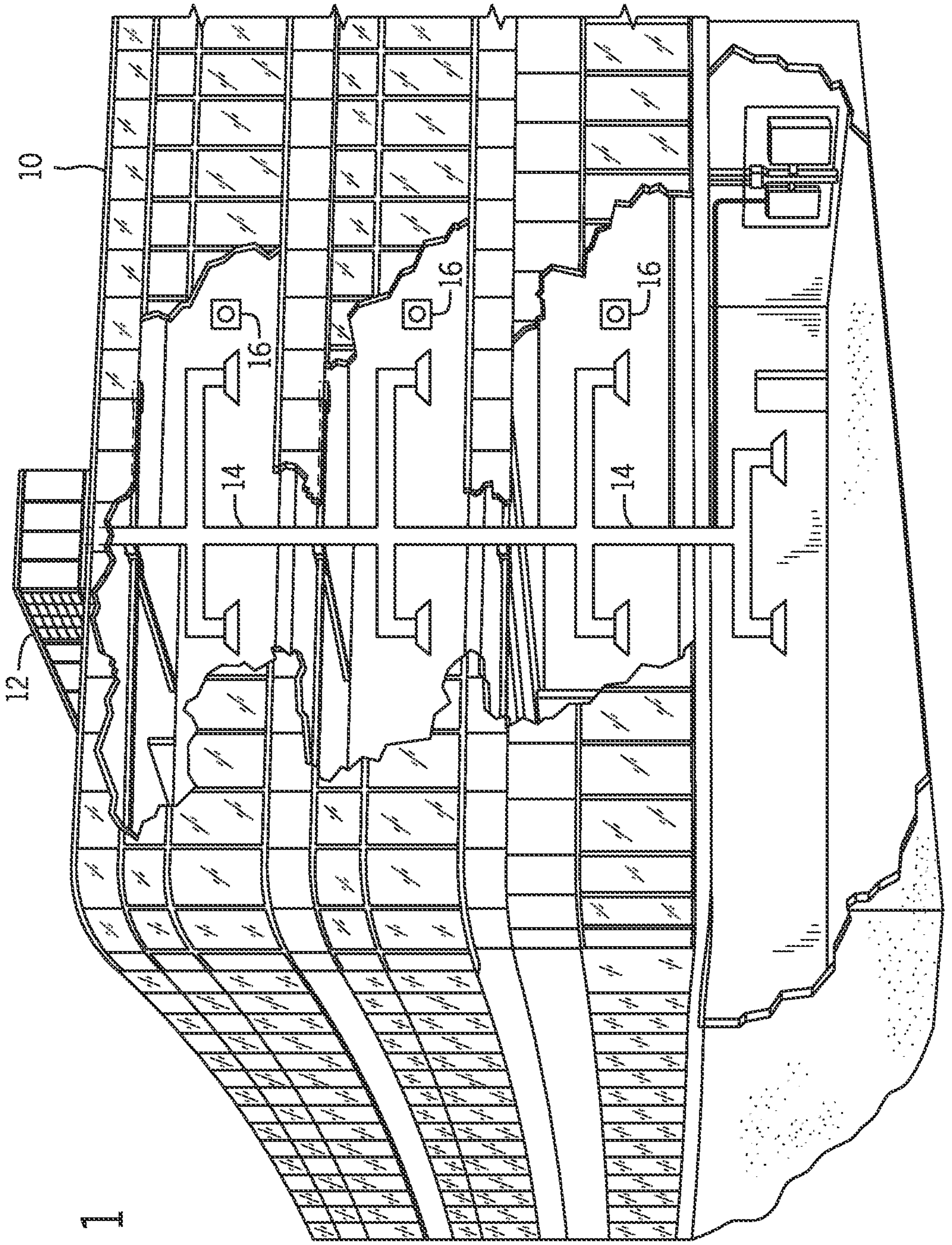
FIG. 1 is a perspective view of an embodiment of a heating, ventilation, and/or air conditioning (HVAC) system for building environmental management that may employ one or more HVAC units, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

As used herein, the terms "approximately," "generally," "substantially," and so forth, are intended to convey that the property value being described may be within a relatively small range of the property value, as those of ordinary skill would understand. For example, when a property value is described as being "approximately" equal to (or, for example, "substantially similar" to) a given value, this is intended to convey that the property value may be within +/−5%, within +/−4%, within +/−3%, within +/−2%, within +/−1%, or even closer, of the given value. Similarly, when a given feature is described as being "substantially parallel" to another feature, "generally perpendicular" to another feature, and so forth, this is intended to convey that the given feature is within +/−5%, within +/−4%, within +/−3%, within +/−2%, within +/−1%, or even closer, to having the described nature, such as being parallel to another feature, being perpendicular to another feature, and so forth. Mathematical terms, such as "parallel" and "perpendicular," should not be rigidly interpreted in a strict mathematical sense, but should instead be interpreted as one of ordinary skill in the art would interpret such terms. For example, one of ordinary skill in the art would understand that two lines that are substantially parallel to each other are parallel to a substantial degree, but may have minor deviation from exactly parallel.

The present disclosure is directed to heating, ventilation, and/or air conditioning (HVAC) systems that may include tube joints configured to enable a connection (e.g., fluid connection) between a heat exchanger and other components disposed upstream and/or downstream of the heat exchanger relative to a direction of working fluid through the heat exchanger. For example, as noted above, the HVAC system may include a heat exchanger through which working fluid may flow. The heat exchanger (e.g., an evaporator) may be fluidly coupled to an expansion valve disposed upstream of the heat exchanger, relative to a direction of the working fluid through the heat exchanger, via a liquid conduit. Additionally, the heat exchanger may be fluidly coupled to a compressor of the HVAC system disposed downstream of the heat exchanger, relative to the direction of the working fluid through the heat exchanger, via a suction conduit. Traditionally, a typical suction conduit (e.g., suction tube) coupling the heat exchanger to a compressor may include multiple brazed joints to connect (e.g., fluidly couple) various components of the heat exchanger to one another. For example, a suction tube may have a first tube segment coupled to one or more heat exchange tubes of the heat exchanger via one or more brazed joints. The suction tube may also include a second tube segment fluidly coupled to a free end of the first tube segment (e.g., a downstream end, an end of the first tube segment that is not coupled to the tubes of the heat exchanger via multiple brazed joints) via an additional brazed joint. A free end of the second tube segment (e.g., a downstream end, an end of the second tube segment that is not coupled to the free end of the first tube segment) may be configured to extend (e.g., pass) through a tubing access panel and external to a housing of the heat exchanger to couple to other components of the HVAC system (e.g., a compressor disposed downstream of the heat exchanger, relative to a direction of a working fluid through the heat exchanger). Unfortunately, in some existing HVAC systems, the multiple brazed connections between the tubes of the heat exchanger and the first tube segment, and/or the brazed connection between the first tube segment and the second tube segment may cause a portion of the second tube segment (e.g., the free end) to become misaligned with the tubing access panel. As a result, time and costs associated with assembly of the HVAC system may be increased as operators address fitment issues and/or realign certain components to be connected to one another. For example, if misalignment between components occurs, the suction tube is typically manually adjusted, thereby increasing time and labor associated with the assembly of the HVAC system (e.g., due to stiffness of the suction tube).

Thus, it is presently recognized that improvements related to tube joint connections (e.g., fluid connections) between a heat exchanger and a conduit configured to discharge working fluid from the heat exchanger (e.g., a suction line, suction tube, suction conduit), and/or a connection between a heat exchanger and a conduit configured to deliver working fluid to the heat exchanger (e.g., a liquid line) are desirable. Accordingly, embodiments of the present disclosure are directed to a tube joint connection (e.g., tube joint coupling, brazed tube joint coupling, brazed tube joint) between a first tube segment of a suction tube and a second tube segment of the suction tube, where each of the first tube segment and the second tube segment include an alignment feature configured to facilitate desired alignment of the first tube segment and the second tube segment with one another. By aligning the alignment feature of the first tube segment with the alignment feature of the second tube segment, proper alignment of the first tube segment and the second tube segment may be verified (e.g., visually verified, physically verified) via a technician prior to mechanical securement (e.g., welding, brazing, fixing) of the first tube segment and the second tube segment to one another in a particular orientation (e.g., fixed orientation). Once proper alignment of the first tube segment and the second tube segment is verified, the first and second tube segments may be mechanically secured (e.g., brazed) to one another to form a tube joint. In this way, an orientation of a free end of the second tube segment (e.g., a downstream end, an end of the second tube segment that is not coupled to the first tube segment) may be more reliably established (e.g., controlled) during assembly of the HVAC system. For example, the free end of the second tube segment of the suction tube may be configured to extend through a tubing access panel of the heat exchanger and connect (e.g., fluidly couple) to various components disposed downstream of the heat exchanger, relative to the direction of working fluid through the heat exchanger (e.g., a compressor). Thus, by aligning the alignment feature of the first tube segment with the alignment feature of the second tube segment, an orientation of the free end of the second tube segment relative to an opening of the tubing access panel may be reliably verified and established (e.g., controlled), such as prior to mechanical securement of the first tube segment and second tube segment to one another. In this way, manufacturing and assembly of the HVAC system may be performed in a more time efficient manner and with reduced errors and subsequent corrective actions, thereby reducing costs associated with the manufacture and assembly of the HVAC system.

Additionally, embodiments of the present disclosure are directed to HVAC systems having heat exchangers with microchannel heat exchanger coils that employ a tube joint connection (e.g., tube joint coupling) between segments of a suction tube, where each segment includes a respective alignment feature configured to facilitate assembly of such HVAC systems. For example, microchannel heat exchanger coils each include multiple internal passageways (e.g., flow paths) through the coils that are smaller in size relative to an internal passageway of a tube of a fin and tube heat exchanger. Additionally, heat exchangers having microchannel coils may generally include fewer brazed joints as compared to heat exchangers having tube and fin coils. For example, each of the microchannel coils in a microchannel heat exchanger may discharge working fluid into a common outlet header, and the common outlet header may be fluidly coupled to a first tube segment. That is, the microchannel coils of the heat exchanger may not be directly coupled to a first tube segment via a brazed joint (as coils are in traditional tube and fin coils), and instead may be coupled to a common outlet header. By employing the common outlet header and coupling the first tube segment to the common outlet header, fewer brazed joints may be employed to assemble the microchannel heat exchanger, thereby further decreasing a likelihood of misalignment between a second tube segment and a tubing access panel of the heat exchanger. Notably, the tube joint connection between the first tube segment and the second tube segment of a microchannel heat exchanger may also employ the alignment features discussed above, thereby facilitating alignment of the second tube segment with the tubing access panel of the heat exchanger.

Turning now to the drawings, FIG. 1 illustrates a heating, ventilation, and/or air conditioning (HVAC) system for building environmental management that may employ one or more HVAC units. The HVAC system of FIG. 1 may also employ present embodiments to limit overflow of condensate into ductwork. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air-cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream. A heat exchanger of the HVAC unit 12, such as one in a refrigeration circuit, may cause generation of condensate that is collected and removed in accordance with embodiments of the presently disclosed drain system and shield.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
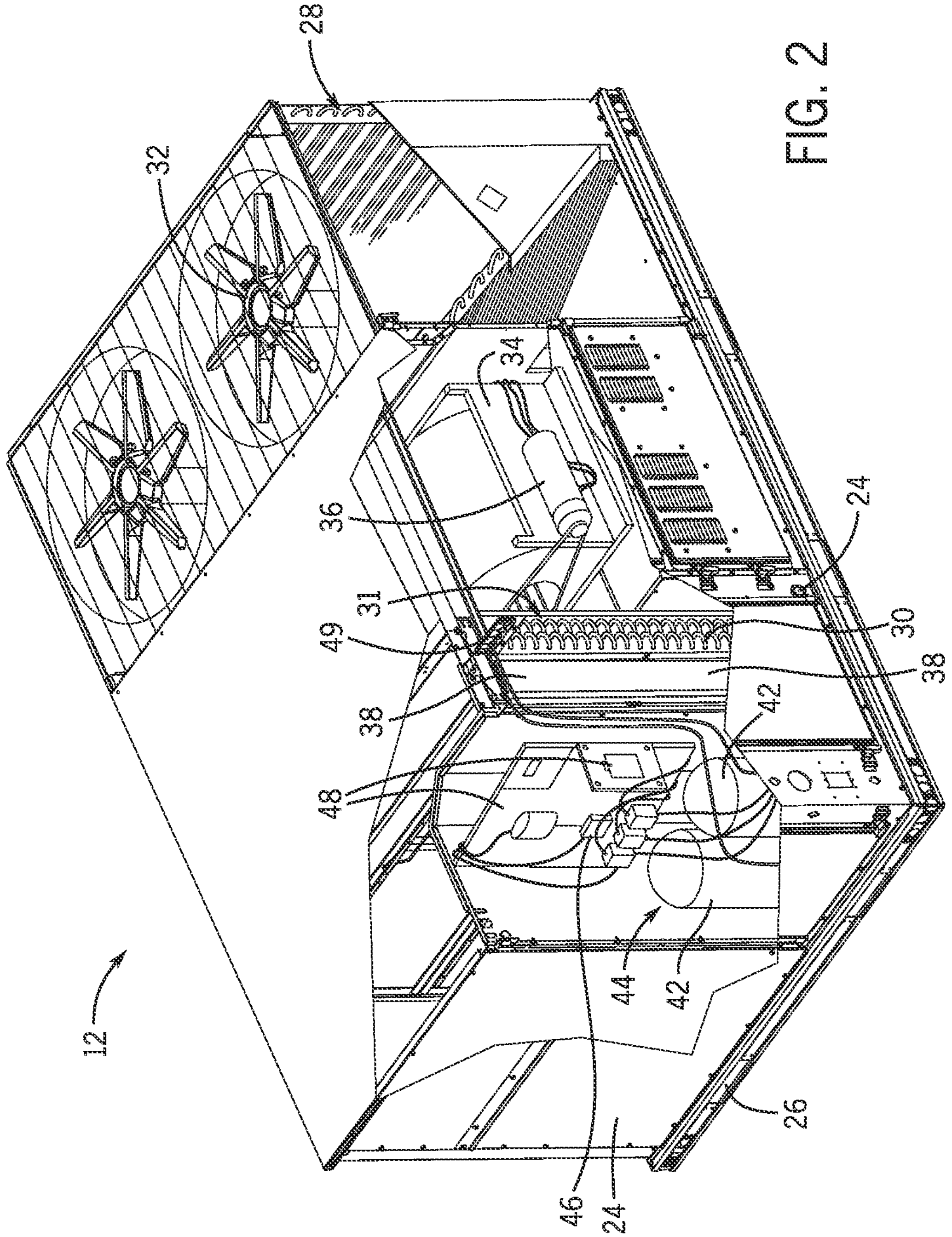
FIG. 2 is a perspective view of an embodiment of an HVAC unit of the HVAC system of FIG. 1, in accordance with aspects of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Such heat exchangers may cause accumulation of condensate from environmental air that is addressed by embodiments of the presently disclosed drainage system. Tubes within the heat exchangers 28 and 30 may circulate a working fluid, such as R-410A, through the heat exchangers 28 and 30. The tubes may be of various types, such as multichannel tubes, microchannel tubes, conventional copper or aluminum tubing, and so forth. Together, the heat exchangers 28 and 30 may implement a thermal cycle in which the working fluid undergoes phase changes and/or temperature changes as it flows through the heat exchangers 28 and 30 to produce heated and/or cooled air. For example, the heat exchanger 28 may function as a condenser where heat is released from the working fluid to ambient air, and the heat exchanger 30 may function as an evaporator where the working fluid absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the working fluid before the working fluid enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
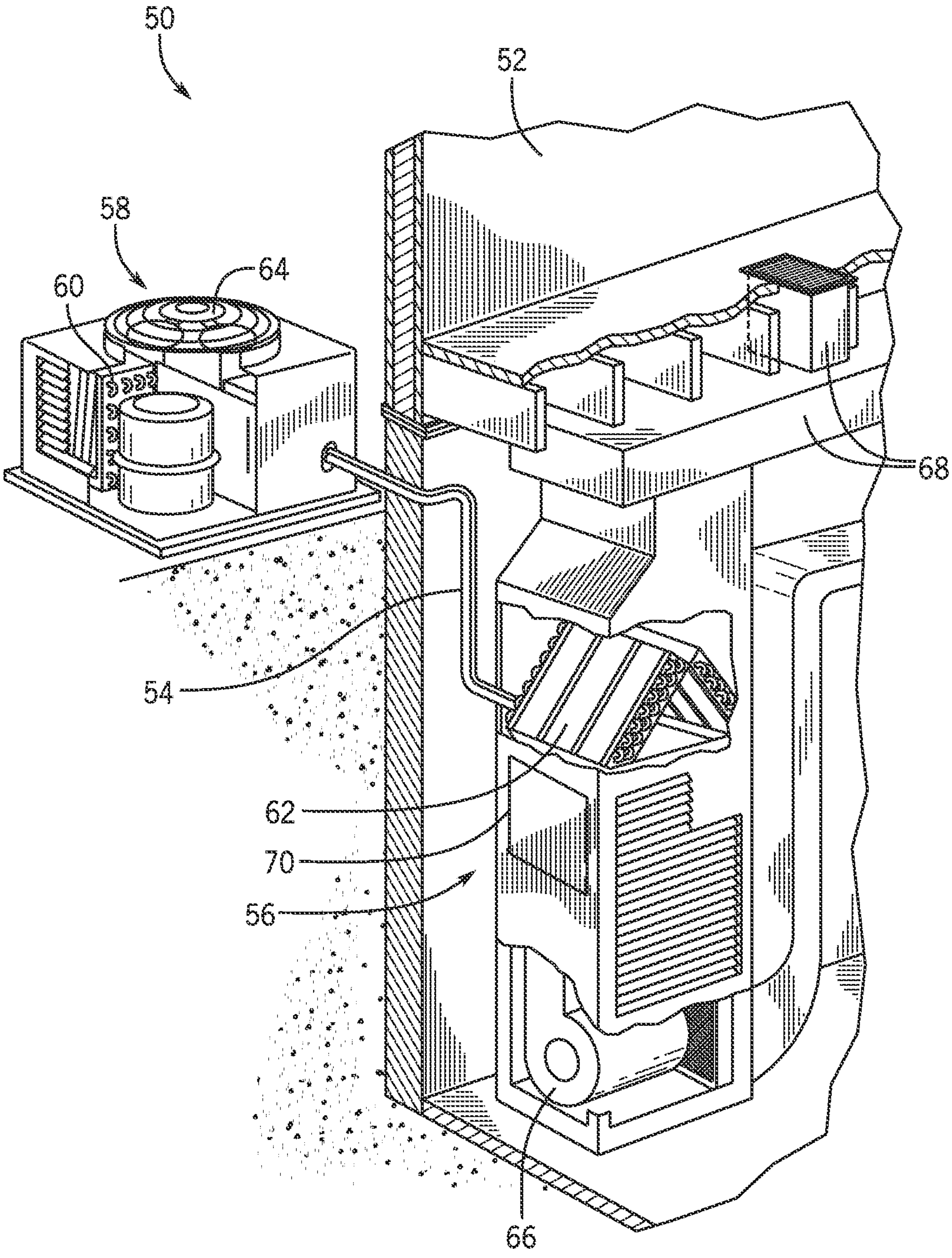
FIG. 3 is a perspective view of an embodiment of a residential split heating and cooling system, in accordance with aspects of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include working fluid conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The working fluid conduits 54 transfer working fluid between the indoor unit 56 and the outdoor unit 58, typically transferring primarily liquid working fluid in one direction and primarily vaporized working fluid in an opposite direction.

When the system shown in FIG. 3 is operating as an air conditioner, a heat exchanger 60 in the outdoor unit 58 serves as a condenser for re-condensing vaporized working fluid flowing from the indoor unit 56 to the outdoor unit 58 via one of the working fluid conduits 54. In these applications, a heat exchanger 62 of the indoor unit functions as an evaporator. Specifically, the heat exchanger 62 receives liquid working fluid, which may be expanded by an expansion device, and evaporates the working fluid before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. In accordance with present embodiments, the indoor unit 56 includes a drain system in accordance with the present disclosure to limit or block condensate generated by cooling of atmospheric air, for example, from entering the ductwork 68. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate working fluid and thereby cool air entering the outdoor unit 58 as the air passes over outdoor the heat exchanger 60. The indoor heat exchanger 62 will receive a stream of air blown over it and will heat the air by condensing the working fluid.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
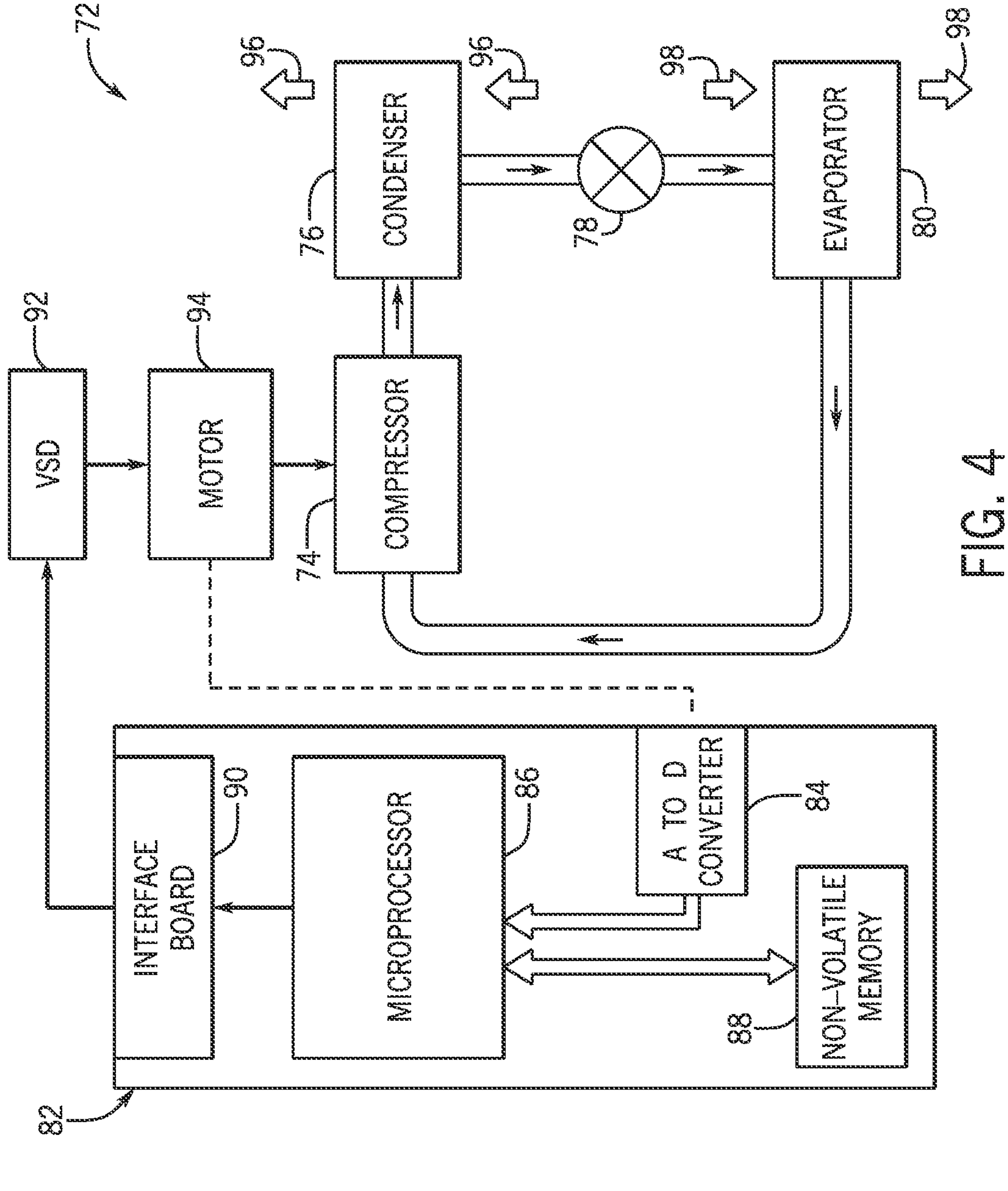
FIG. 4 is a schematic view of an embodiment of a vapor compression system that may be used in an HVAC system, in accordance with aspects of the present disclosure.

FIG. 4 is an embodiment of a vapor compression system 72 that can be used in any of the systems described above and incorporates one or more drainage system in accordance with present embodiments. The vapor compression system 72 may circulate a working fluid through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a working fluid vapor and delivers the vapor to the condenser 76 through a discharge passage. In some embodiments, the compressor 74 may be a centrifugal compressor. The working fluid vapor delivered by the compressor 74 to the condenser 76 may transfer heat to a fluid passing across the condenser 76, such as ambient or environmental air 96. The working fluid vapor may condense to a working fluid liquid in the condenser 76 as a result of thermal heat transfer with the environmental air 96. The liquid working fluid from the condenser 76 may flow through the expansion device 78 to the evaporator 80.

The liquid working fluid delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid working fluid in the evaporator 80 may undergo a phase change from the liquid working fluid to a working fluid vapor. In this manner, the evaporator 80 may reduce the temperature of the supply air stream 98 via thermal heat transfer with the working fluid. Thereafter, the vapor working fluid exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed below, an HVAC system, such as the HVAC unit 12, the residential heating and cooling system 50, and/or the vapor compression system 72, may utilize a heat exchanger, such as the heat exchanger 80 (e.g., a micro-channel heat exchanger), through which a working fluid may flow. For example, the heat exchanger may receive a working fluid from an expansion valve or device disposed upstream of the heat exchanger, relative to a direction of the working fluid therethrough, via a liquid conduit (e.g., a liquid line, a liquid tube), and the working fluid may be directed through the coils of the heat exchanger. The coils of the heat exchanger may discharge working fluid that has undergone a heat exchange process with an additional fluid (e.g., air) directed across the heat exchanger into a common outlet header. The heat exchanger may also include a suction tube (e.g., suction line, suction conduit) that fluidly couples the heat exchanger to a compressor disposed downstream of the heat exchanger, relative to a direction of the working fluid therethrough. The suction tube may be configured to extend through a tubing access panel of the heat exchanger to facilitate a connection (e.g., fluid coupling) between the suction tube and the compressor.

The suction tube may include a first tube segment that is fluidly coupled to (e.g., connected to) the common outlet header and a second tube segment that is configured to extend through the tubing access panel and facilitate a fluid connection to the compressor. Each of the first and second tube segments may include an alignment feature configured to facilitate alignment between the first tube segment and the second tube segment. For example, a free end of the first tube segment (e.g., a downstream end, an end of the first tube segment that is not coupled to the common outlet header) may include a first alignment feature (e.g., recess, notch, cutout, mark, engraving, protrusion, dimple, key), and a first end of the second tube segment (e.g., upstream end, an end of the second tube segment that is coupled to the free end of the first tube segment) may include a second alignment feature (e.g., dimple, protrusion, key, mark, engraving, recess, notch, cutout) configured to align with the first alignment feature. By aligning the first alignment feature of the first tube segment with the second alignment feature of the second tube segment, tolerances may be reduced and an orientation of a second end of the second tube segment (e.g., end of the second tube segment that is not coupled to the first tube segment) relative to a tubing access panel through which the second end of the second tube segment extends may be verified prior to mechanical securement of the first tube segment and the second tube segment. For example, establishing an alignment of the first alignment feature of the first tube segment with the second alignment feature of the second tube segment may enable verification of proper alignment of the second free end of the second tube segment relative to the tubing access panel (e.g., prior to mechanically fixing the first tube segment and the second tube segment to one another). As discussed herein, "proper alignment" between the suction tube (e.g., second end of the second tube segment of the suction tube) and the tubing access panel may refer to a configuration in which the second end of the second tube segment extends through an opening of the tubing access panel in a desired manner, such as along an axis that is substantially crosswise (e.g., perpendicular) to a plane along which the tubing access panel extends. In this way, assembly of the heat exchanger and the HVAC system may be completed with reduced instances of misalignment of components, which may reduce costs associated with the assembly of HVAC systems employing suction tubes having the alignment features.

Figure 5:
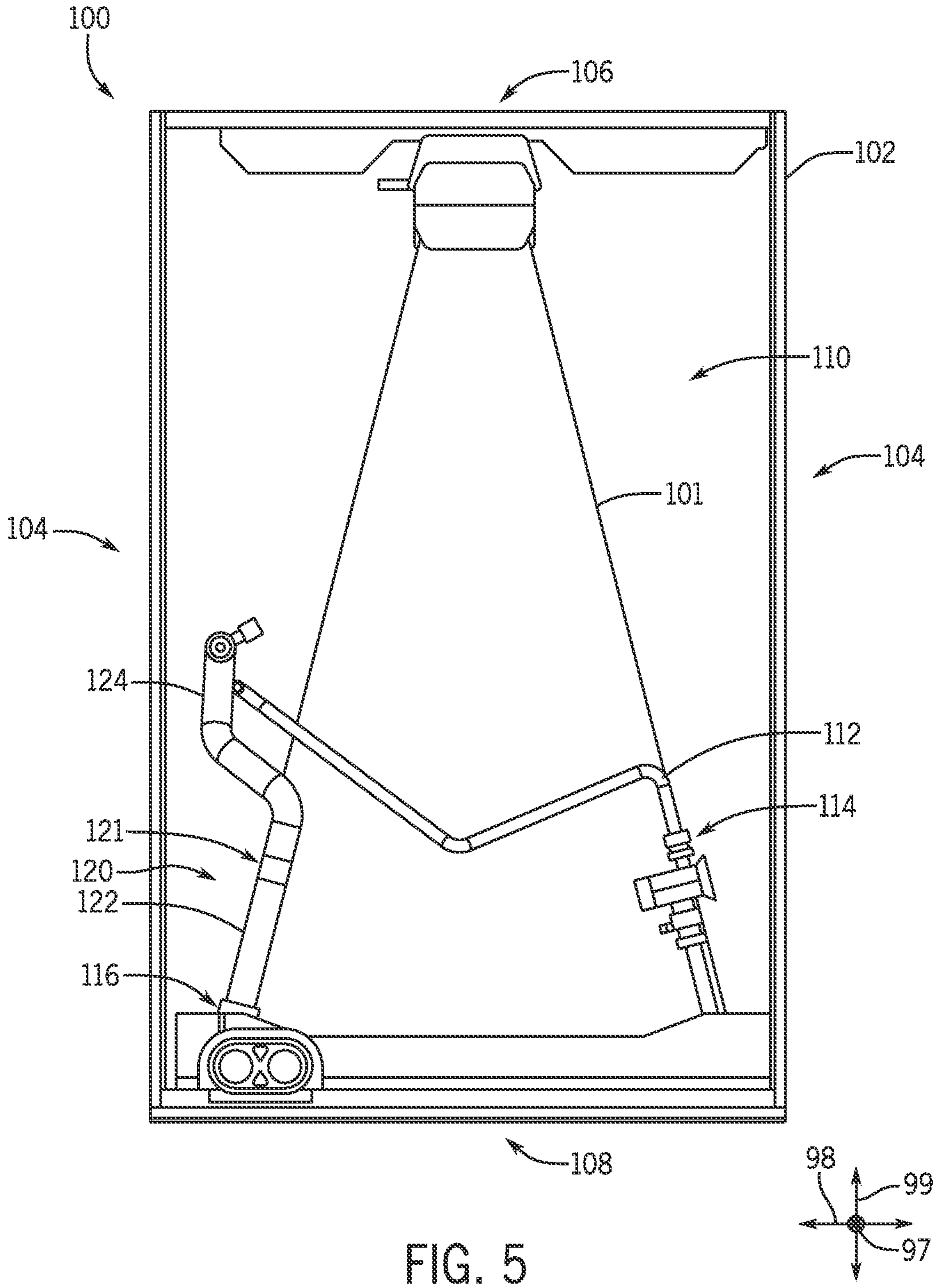
FIG. 5 is a side view of an embodiment of a heat exchanger system that may be used in an HVAC system, in accordance with aspects of the present disclosure.
Figure 6:
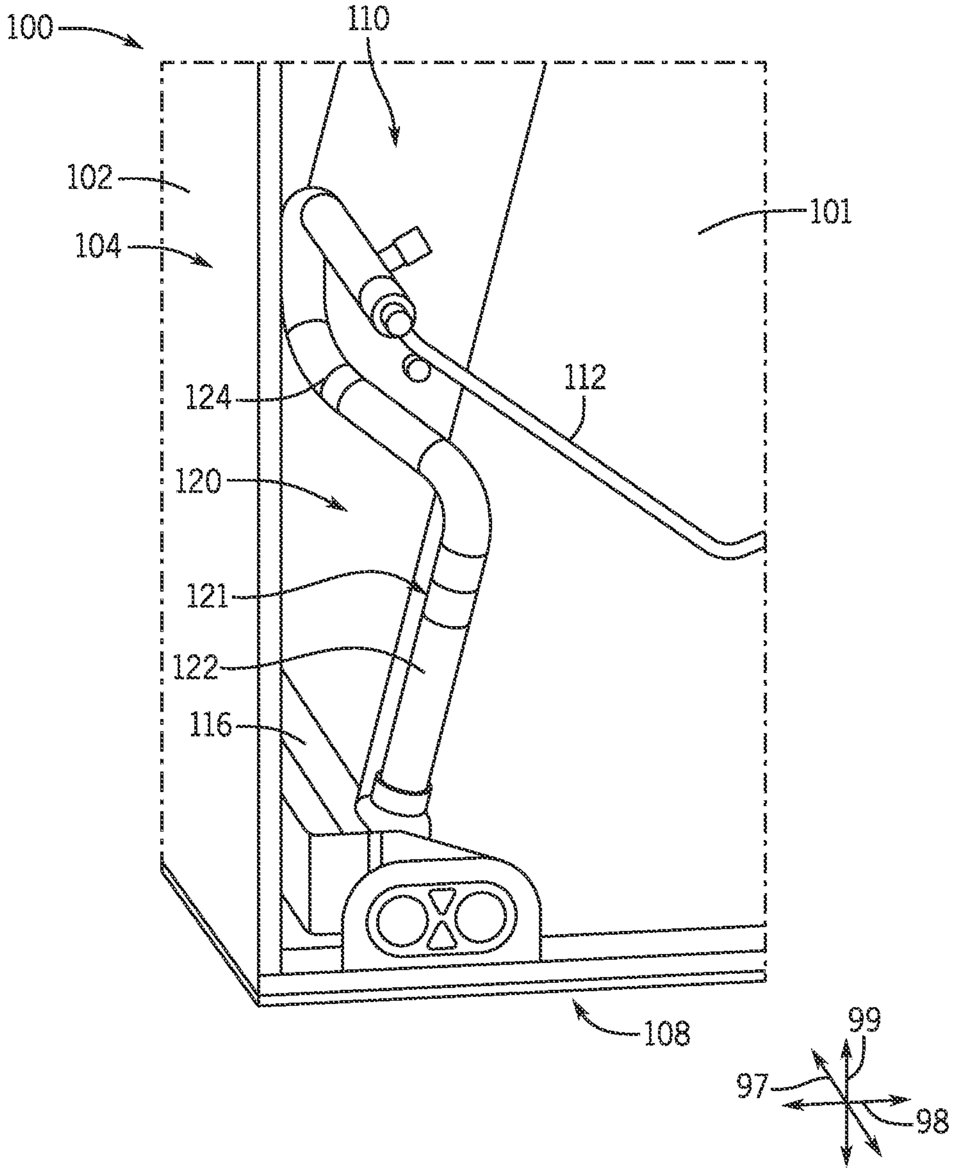
FIG. 6 is a perspective view of a portion of an embodiment of a heat exchanger system that may be used in an HVAC system, in accordance with aspects of the present disclosure.

With the preceding in mind, FIG. 5 is a side view of an embodiment of a heat exchanger system 100 that may be employed in an HVAC system, such as the HVAC unit 12 of FIG. 1, and FIG. 6 is a perspective view of an embodiment of the heat exchanger system 100. FIGS. 5 and 6 are discussed concurrently below. In the illustrated embodiments, the heat exchanger system 100 is oriented along a longitudinal axis 97, a lateral axis 98, and a vertical axis 99. The heat exchanger system 100 includes a heat exchanger 101 configured to receive and direct a working fluid (e.g., refrigerant) through tubes to condense, cool, and/or dehumidify a conditioning fluid (e.g., air, water) directed across the tubes. For example, the heat exchanger 101 may correspond to the evaporator 80 of FIG. 4 discussed above, and may be configured to receive low-pressure working fluid liquid from components disposed upstream of the heat exchanger 101 relative to a flow direction of the working fluid through the heat exchanger 101 (e.g., a condenser, an expansion valve). As the low-pressure working fluid is directed through the tubes of the heat exchanger 101, a conditioning fluid (e.g., air) may be directed across the tubes, and the working fluid may exchange heat with the conditioning fluid. For example, the conditioning fluid may be an air flow that has a higher temperature than the working fluid directed through the tubes of the heat exchanger 101. Thus, as the conditioning fluid is directed across the tubes, the conditioning fluid may transfer heat to the working fluid, thereby causing a temperature of the conditioning fluid to decrease while a temperature of the working fluid increases. The conditioning fluid may then be directed to a temperature-controlled space (e.g., room, building) to provide cooling, while the working fluid is directed toward a compressor to continue through a vapor compression cycle. While any of various types of heat exchangers may be employed, the illustrated embodiment includes a microchannel heat exchanger. However, it should be understood that the features described herein may apply to other types of heat exchanger embodiments (e.g., fin and tube) as well.

In the illustrated embodiments, the heat exchanger system 100 includes a housing 102 (e.g., enclosure) configured to provide support and protection for various components of the heat exchanger 101. For example, the housing 102 may include multiple lateral sides 104, a top side 106 (e.g., upper side), and a bottom side 108 (e.g., base) that collectively define an interior volume 110 of the heat exchanger system 100. In certain embodiments, the heat exchanger 101 may include a conduit 112 (e.g., liquid line, liquid conduit) configured to receive working fluid from components disposed upstream of the heat exchanger 101 relative to a flow direction of working fluid through the heat exchanger 101 (e.g., a condenser, an expansion valve). The conduit 112 may be fluidly coupled to an inlet 114 of the heat exchanger 101, and the inlet 114 may be fluidly coupled to the tubes of the heat exchanger 101, thereby enabling working fluid to be directed into the tubes of the heat exchanger 101.

The working fluid may be directed through the tubes of the heat exchanger 101 to exchange heat with a conditioning fluid, as discussed above. After undergoing heat exchange with the conditioning fluid directed across the tubes, the working fluid may be discharged from the tubes of the heat exchanger 101 into a common outlet header 116. The common outlet header 116 may be fluidly coupled to a suction tube 120 (e.g., suction line, suction conduit) of the heat exchanger 101, and the suction tube 120 of the heat exchanger 101 may be fluidly coupled to various components disposed downstream of the heat exchanger 101 relative to the flow direction of working fluid through the heat exchanger 101. For example, the suction tube 120 may be fluidly coupled to a compressor of an HVAC system employing the heat exchanger 101, such as the compressor 74 of FIG. 4. Thus, in embodiments in which the heat exchanger 101 is an evaporator, the suction tube 120 may be configured to deliver vaporous working fluid received from the common outlet header 116 to the compressor.

As noted above, a difficulty associated with the assembly of traditional heat exchangers employing a suction tube may be increased due to the misalignment of the suction tube relative to a tubing access panel of the heat exchanger system through which the suction tube may extend. For example, in traditional systems, multiple brazed joints between tubes of the heat exchanger may cause one or more tubes of the heat exchanger to extend through a panel of a heat exchanger housing at undesirable angle. To address such shortcomings, the suction tube 120 of present embodiments may include multiple portions (e.g., tube segments) that are configured to couple to one another via a tube joint 121 (e.g., specialized tube joint, brazed tube joint). The tube joint 121 may be configured to facilitate proper alignment of a free end of the suction tube 120 relative to a tubing access panel through which the free end of the suction tube 120 extends. For example, the suction tube 120 may include a first tube segment 122 and a second tube segment 124. The first tube segment 122 may be fluidly coupled to the common outlet header 116 and may be configured to receive working fluid that has been discharged from the tubes of the heat exchanger 101 via the common outlet header 116. The second tube segment 124 may be fluidly coupled to the first tube segment 122 via the tube joint 121 (e.g., via a brazed joint), thereby enabling working fluid received by the first tube segment 122 to be delivered to the second tube segment 124 and ultimately directed to downstream components of an HVAC system employing the heat exchanger 101 (e.g., a compressor).

In certain embodiments, the tube joint 121 coupling the first tube segment 122 and the second tube segment 124 may be configured to facilitate proper alignment of the second tube segment 124 with a tubing access panel through which the second tube segment 124 may extend. For example, the first tube segment 122 may include a first alignment feature (e.g., dimple, protrusion, key, obstruction, mark, engraving, notch, slot) disposed proximate an end of the first tube segment 122 that is coupled to (e.g., directly coupled to, engaged with) the second tube segment 124, and the second tube segment 124 may include a second alignment feature (e.g., notch, slot, mark, engraving, dimple, protrusion, key, obstruction) disposed proximate an end of the second tube segment 124 that is coupled to (e.g., directly coupled to, engaged with) the first tube segment 122. The first alignment feature of the first tube segment 122 and the second alignment feature of the second tube segment 124 may be configured to engage with one another and/or cooperatively provide an indication (e.g., visual indication, physical indication) of alignment of the first tube segment 122 and the second tube segment 124 in a particular orientation (e.g., rotational orientation, angular orientation). For example, during manufacture and/or assembly of the heat exchanger 101, an operator or manufacturer may align the first alignment feature with the second alignment feature. In doing so, a proper orientation (e.g., target orientation, desired orientation, target alignment) of a free end of the second tube segment 124 (e.g., end of the second tube segment 124 that is not coupled to the first tube segment 122) relative to a tubing access panel of the heat exchanger system 100 may be achieved, as described in greater detail below. As discussed herein, a “target orientation,” a “desired orientation,” and/or a target alignment may refer to an angular orientation of the first tube segment 122 relative to the second tube segment 124 and/or an angular orientation (e.g., alignment) of the second tube segment 124 relative to an opening of a tubing access panel through which the second tube segment 124 extends.

Figure 7:
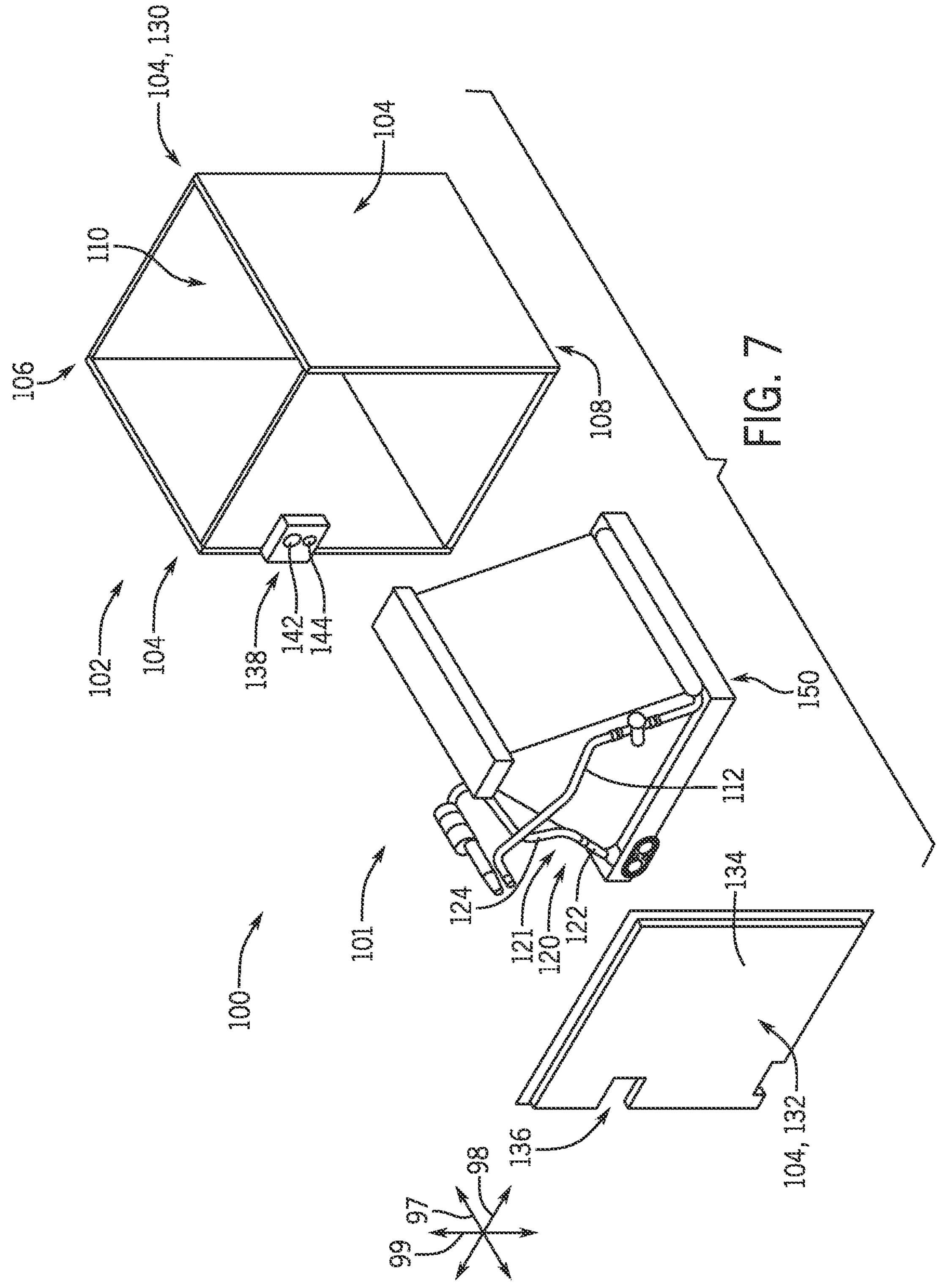
FIG. 7 is an exploded perspective view of an embodiment of a heat exchanger system, in accordance with aspects of the present disclosure.

FIG. 7 is an exploded perspective view of an embodiment of the heat exchanger system 100, such as the heat exchanger system 100 of FIG. 5. In the illustrated embodiment, the housing 102 includes the multiple lateral sides 104, the top side 106, and the bottom side 108 that collectively define the interior volume 110 in which the heat exchanger 101 is disposed. In certain embodiments, a first lateral side 104 may correspond to a rear side 130, and a second lateral side 104 may correspond to a front side 132 of the housing 102. The front side 132 may include a panel 134 (e.g., door) that is detachably attached to the housing 102 via one or more hinges, screws, or any other suitable fastening mechanism. The panel 134 may define an opening 136 (e.g., cavity, recess, cutout), and a tubing access panel 138 may be coupled to the panel 134 to at least partially occlude the opening 136. In certain embodiments, the tubing access panel 138 may be detachably attached to the panel 134 via one or more screws, fasteners, or any other suitable fastening mechanism. The tubing access panel 138 may include one or more openings that define passages configured to receive the suction tube 120 and the conduit 112.

Figure 8:
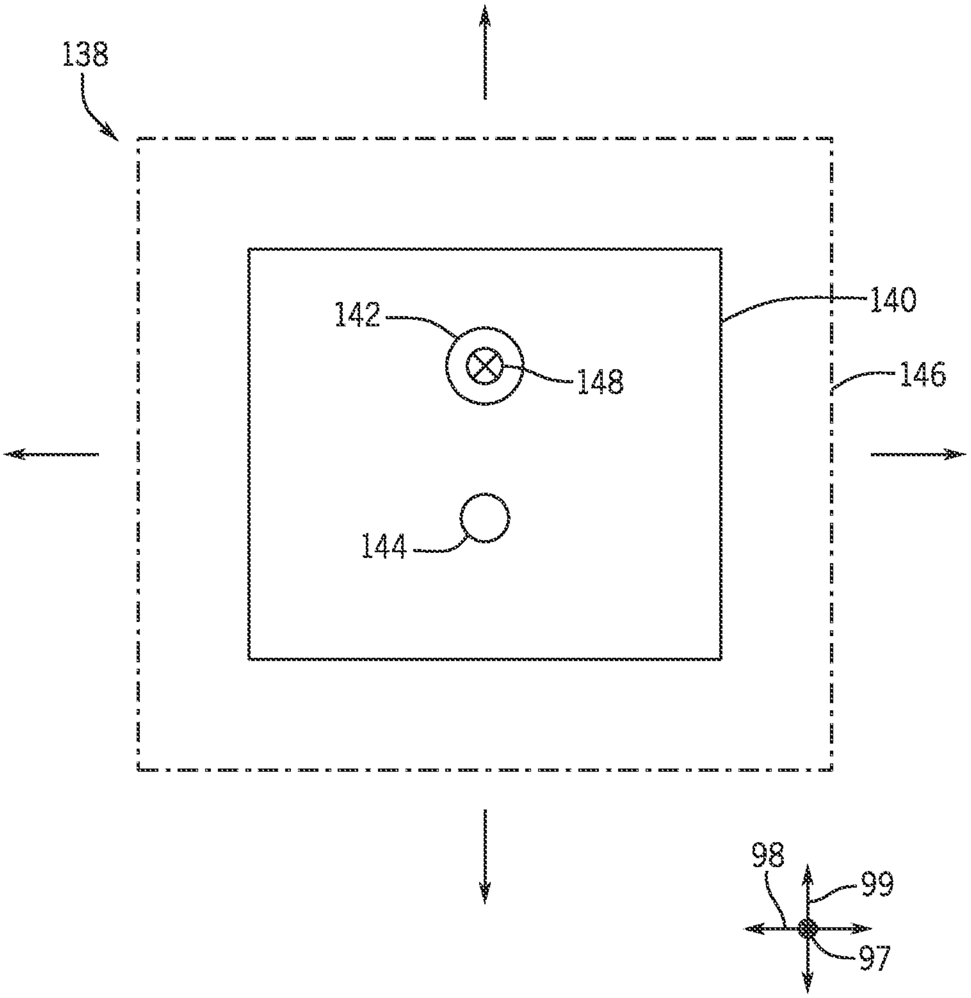
FIG. 8 is a schematic front view of an embodiment of a tubing access panel that may be used in a heat exchanger system, in accordance with aspects of the present disclosure.

For example, FIG. 8 is a schematic front view of an embodiment of the tubing access panel 138, illustrating openings through which the suction tube 120 and the conduit 112 may extend. As shown in FIG. 8, the tubing access panel 138 includes a body 140 that defines a first opening 142 and a second opening 144. A portion (e.g., a free end) of the second tube segment 124 of the suction tube 120 (e.g., end of the second tube segment 124 that is not coupled to the first tube segment 122) may be configured to extend through the first opening 140, and a portion (e.g., a free end) of the conduit 112 (e.g., end of the conduit 112 that is not coupled to the inlet 114) may be configured to extend through the second opening 144. As discussed in greater detail herein, alignment of the alignment feature of the first tube segment 122 with the alignment feature of the second tube segment 124 may facilitate proper alignment of the free end of the second tube segment 124 with the first opening 142. For example, the tubing access panel 138 may extend along a plane 146, and a portion of the second tube segment 124 having the free end may be configured to extend in a direction (e.g., horizontal direction) along an axis 148 that extends substantially crosswise (e.g., perpendicularly) to the plane 146. In certain embodiments, the plane 146 may extend along the lateral axis 98 and the vertical axis 99, and the axis 148 may extend along the longitudinal axis 97.

In certain embodiments, a diameter of the suction tube 120 and a diameter of the conduit 112 may be different, and thus, each of the openings 142, 144 may be sized differently to accommodate different sized conduits, tubes, and/or pipes extending through the openings 142, 144. For example, in the illustrated embodiment, the second opening 144 configured to receive the conduit 112 is smaller than the first opening 142 configured to receive the suction tube 120. Further, while the first opening 142 configured to receive the suction tube 120 is illustrated as being above the second opening 144 configured to receive the conduit 112 relative to gravity, the location and/or size of the first and second openings 142, 144 is not limited to the arrangement shown in the illustrated embodiment. For example, in other embodiments, the first opening 142 may be disposed below the second opening 144 relative to gravity, or the first and second openings 142, 144 may be aligned horizontally such that the first opening 142 is positioned to the left or the right of the second opening 144.

Returning to FIG. 7, each of the suction tube 120 and the conduit 112 may be configured to extend through the openings 142, 144 of the tubing access panel 138, respectively, thereby enabling the suction tube 120 and the conduit 112 to couple to other components of an HVAC system disposed upstream and/or downstream of the heat exchanger 101. Further, as noted above, the suction tube 120 may include the tube joint 121 (e.g., brazed tube joint) between the first tube segment 122 and the second tube segment 124 configured to facilitate alignment of the free end of the second tube segment 124 (e.g., end of the second segment 124 that is not coupled to the first tube segment 122) of the suction tube 120 with the opening 142, as discussed in greater detail below. In certain embodiments, the heat exchanger system 100 may also include additional components configured to enable efficient operation of an HVAC system employing the heat exchanger system 100. For example, the heat exchanger system 100 may include a condensate drain pan 150 disposed below the heat exchanger 101 and configured to receive condensate generated during operation of the heat exchanger 101.

Figure 9:
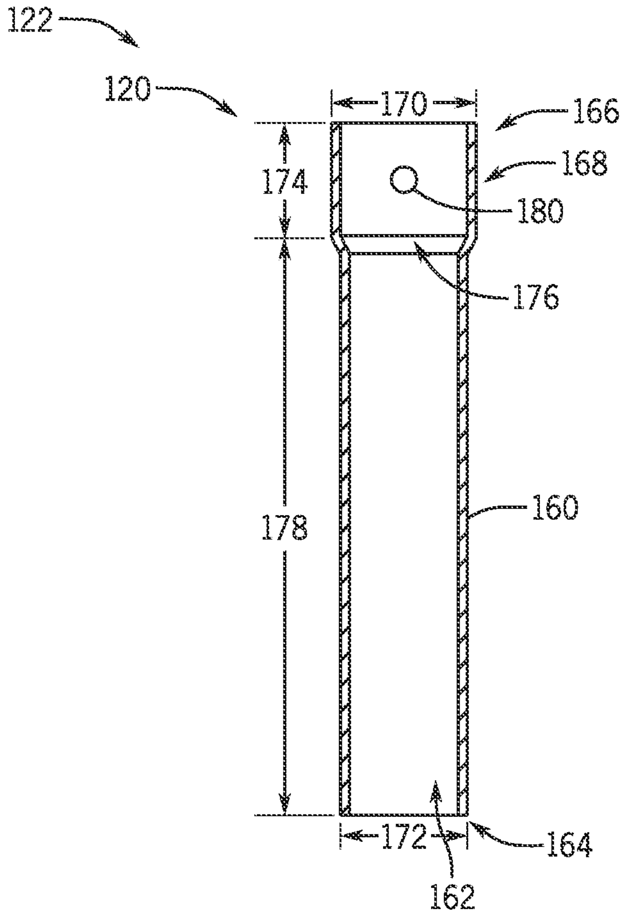
FIG. 9 is a side view of an embodiment of a first tube segment of a suction tube that may be used in a heat exchanger system, in accordance with aspects of the present disclosure.

FIG. 9 is a side view of an embodiment of the first tube segment 122 of an embodiment of the suction tube 120. In the illustrated embodiment, the first tube segment 122 is generally a straight (e.g., linear), tubular member having a body 160 that defines an interior passage 162 through which working fluid may flow. The body 160 may include a first end 164 (e.g., upstream end, header end) and a second end 166 (e.g., downstream end, free end, tube joint end), and each of the first end 164 and second end 166 may include an opening configured to direct working fluid therethrough. In certain embodiments, the first end 164 of the first tube segment 122 may be fluidly coupled to the common outlet header 116 of the heat exchanger 101 via any suitable manner of securement in an assembled configuration of the heat exchanger 101. In this way, working fluid collected by the common outlet header 116 may be directed into the interior passage 162 of the first tube segment 122.

As noted above, the first tube segment 122 may be configured to couple to the second tube segment 124 of the suction tube 120 via the tube joint 121. For example, in certain embodiments, a portion of the first tube segment 122 may be configured to receive a portion of the second tube segment 124 to couple the first and second tube segments 122, 124 to one another. To this end, the second end 166 of the first tube segment may include a collar 168 configured to receive at least a portion of the second tube segment 124. In certain embodiments, a diameter 170 of the collar 168 (e.g., a diameter 170 of the second end 166) may be greater than a diameter of the second tube segment 124, thereby enabling the second end 166 of the first tube segment 122 to receive a portion of the second tube segment 124. Additionally, the diameter 170 of the collar 168 may be greater than a diameter 172 of the first end 164 of the first tube segment 122. For example, the collar 168 may extend along a portion 174 of the first tube segment 122 and may terminate at a surface 176 (e.g., stopping surface, ridge, chamfer, shoulder). The surface 176 may be configured to limit the second tube segment 124 from extending beyond the surface 176 when the first tube segment 122 and the second tube segment 124 are coupled to one another. For example, a diameter of the first tube segment 122 may decrease at the surface 176, such that a second portion 178 (e.g., portion of the first tube segment 122 that does not include the collar 168) of the first tube segment 122 may have a diameter substantially similar to the diameter 172 of the first end 164 of the first tube segment 122.

In certain embodiments, the collar 168 (or the second end 166) may include an alignment feature 180 (e.g., dimple, protrusion, key, pin, mark, engraving) configured to align with an alignment feature of the second tube segment 124, thereby facilitating assembly of the heat exchanger 101 (e.g., facilitating proper alignment of the second tube segment 124 relative to the tubing access panel 138). For example, in the illustrated embodiment, the alignment feature 180 is a dimple or protrusion that extends in a direction (e.g., radially inward direction) toward the interior passage 162 of the first tube segment 122. The alignment feature 180 may be configured to interact with (e.g., engage with, align with) an alignment feature of the second tube segment 124 to ensure proper alignment of a free end of the second tube segment 124 (e.g., end of the second tube segment 124 that is not received by the first tube segment 122) relative to the tubing access panel 138. For example, in certain embodiments, because the first tube segment 122 is configured to receive the second tube segment 124 (e.g., because a portion of the second tube segment 124 is disposed within the interior passage 162, such as within the collar 168), the alignment feature 180 may extend radially inward, thereby enabling the alignment feature 180 to engage with an alignment feature of the second tube segment 124, as discussed in greater detail below.

Figure 10:
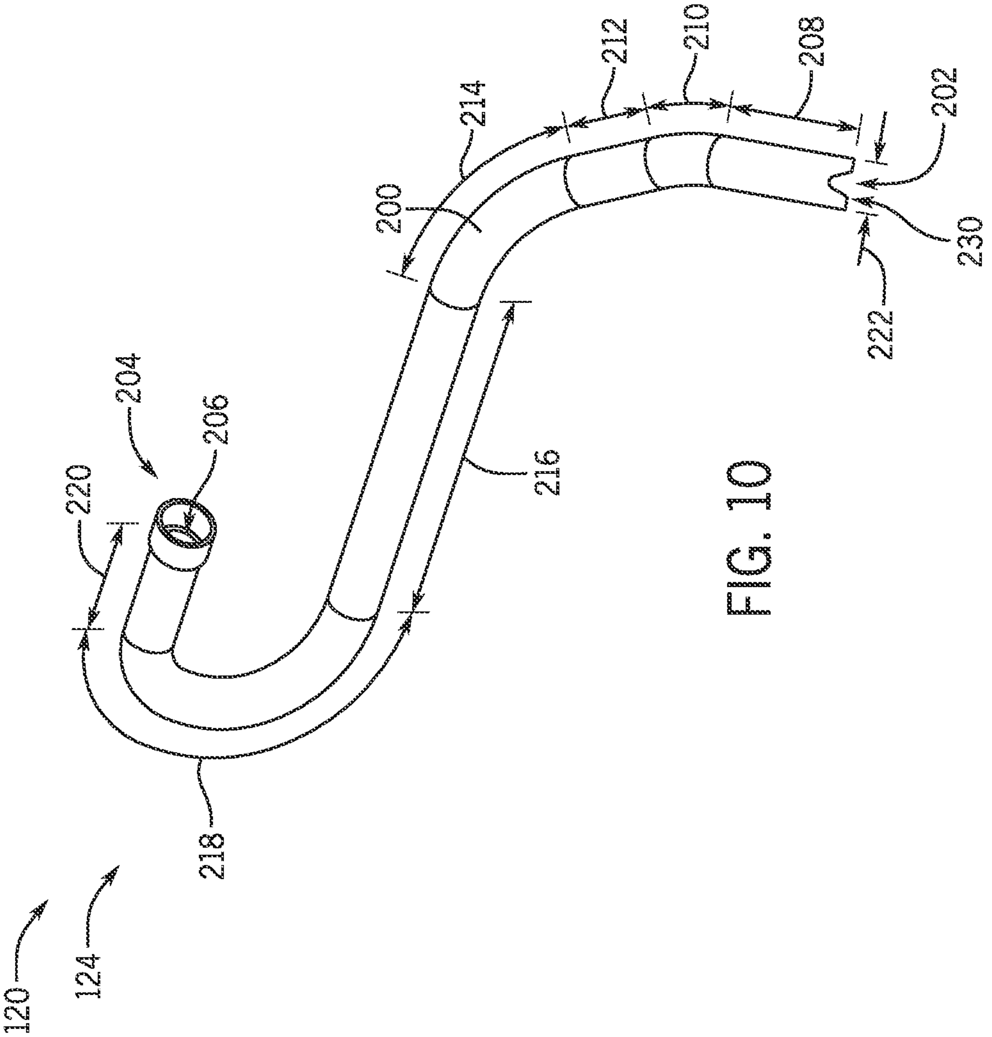
FIG. 10 is a perspective view of an embodiment of a second tube segment of a suction tube that may be used in a heat exchanger system, in accordance with aspects of the present disclosure.

FIG. 10 is a perspective view of an embodiment of the second tube segment 124 of an embodiment of the suction tube 120. In the illustrated embodiment, the second tube segment 124 includes a body 200 extending between a first end 202 (e.g., upstream end, tube joint end) and a second end 204 (e.g., downstream end, free end) of the second tube segment 124. The body 200 may include multiple portions (e.g., one or more straight portions, one or more bent portions) successively extending from the first end 202 to the second end 204 that collectively define an interior passage 206 through which working fluid may flow. For example, the body 200 may include a first portion 208 (e.g., first straight portion, coupling portion, tube joint portion), a second portion 210 (e.g., first bent portion), a third portion 212 (e.g., second straight portion), a fourth portion 214 (e.g., second bent portion), a fifth portion 216 (e.g., third straight portion, middle portion), a sixth portion 218 (e.g., third bent portion, U-bend portion), and a seventh portion 220 (e.g., free portion, fourth straight portion, downstream portion). The first portion 208 may be configured to couple to the first tube segment 122 (e.g., the first portion 208 may be configured to be inserted into the collar 168 of the first tube segment 122, brazed to the first tube segment 122), and the seventh portion 220 may be configured to extend through the tubing access panel 138 and fluidly couple to downstream components of an HVAC system employing the suction tube 120 (e.g., compressor) in an assembled configuration of the heat exchanger system 100. In certain embodiments, the first portion 208 may include the first end 202 having an alignment feature configured to align with the alignment feature 180 of the first tube segment 122 and the seventh portion 220 may include the second end 204, as discussed in greater detail below.

In order to ensure proper alignment (e.g., in order to achieve a target orientation or target alignment) of the seventh portion 220 (e.g., the second end 204) of the second tube segment 124 with the first opening 142 of the tubing access panel 138, the first end 202 (e.g., first portion 208) of the second tube segment 124 may include an alignment feature 230 (e.g., notch, recess, mark, engraving) configured to align with (e.g., engage with, interact with) the alignment feature 180 of the first tube segment 122. For example, as noted above, the second end 166 of the first tube segment 122 may be configured to receive the first end 204 of the second tube segment 124. Accordingly, in certain embodiments, a diameter 222 of the body 200 of the second tube segment 124 (e.g., a diameter 222 of the first portion 208 of the second tube segment 124) may be less than the diameter 170 of the collar 168 of the first tube segment 122, thereby enabling the first end 202 of the second tube segment 124 (e.g., first portion 208) to be inserted into the collar 168 of the first tube segment 122. Upon inserting the first end 202 of the second tube segment 124 into the second end 166 of the first tube segment 122 (e.g., upon inserting the first portion 208 of the second tube segment 124 into the collar 168 of the first tube segment 122), the second tube segment 124 may be adjusted (e.g., rotated along an axis that extends along the first tube segment 122 in an installed configuration of the suction tube 120) until the alignment feature 230 of the second tube segment 224 aligns with (e.g., engages with, interacts with) the alignment feature 180 of the first tube segment 122. Indeed, by aligning the alignment feature 180 of the first tube segment 122 with the alignment feature 230 of the second tube segment 124, proper alignment of the first tube segment 122 and the second tube segment 124 may be verified (e.g., visually verified, physically verified) via a technician prior to mechanical securement (e.g., welding, brazing, fixing) of the first tube segment 122 and the second tube segment 124 to one another in a particular orientation (e.g., fixed orientation).

Once proper alignment of the alignment feature 180 of the first tube segment 122 with the alignment feature 230 of the second tube segment 124 is verified, the first tube segment 122 and the second tube segment 124 may be secured to one another via mechanical securement (e.g., brazing, welding, fixing). For example, once the alignment features 180, 230 are aligned, the tube joint 121 may be created by brazing the first tube segment 122 to the second tube segment 124 to one another. In this way, an orientation (e.g., a target orientation, desired orientation, proper orientation, target alignment) of the seventh portion 220 of the second tube segment 124 may be more reliably established (e.g., controlled) during assembly of a heat exchanger system, such as the heat exchanger system 100. Indeed, by utilizing the alignment features 180, 230 of the first and second tube segments 122, 124, respectively, and by brazing the first and second tube segments 122, 124 to one another once the alignment features 180, 230 are aligned, the tube joint 121 may ensure proper alignment and/or proper orientation of the second end 204 (e.g., seventh portion 220) of the second tube segment 124 relative to the first opening 142 of the tubing access panel 138. For example, aligning the alignment feature 180 of the first tube segment 122 with the alignment feature 230 of the second tube segment 124 may cause the seventh portion 220 to extend along the axis 148 which extends substantially crosswise (e.g., perpendicularly) to the plane 146 through which the tubing access panel 138 extends. Thus, by aligning the alignment feature 180 of the first tube segment 122, an orientation (e.g., a target orientation) of the second end 204 (e.g., seventh portion 220) relative to the opening 142 of the tubing access panel 138 may be reliably verified and established (e.g., controlled), such as prior to mechanical securement of the first tube segment 122 and the second tube segment 124 to one another. In this way, manufacturing and assembly of heat exchanger systems employing the tube joint 121 may be performed in a more time efficient manner and with reduced errors and subsequent corrective actions, thereby reducing costs associated with the manufacture and assembly of such heat exchanger systems.

Figures 11A, 11B, 11C:
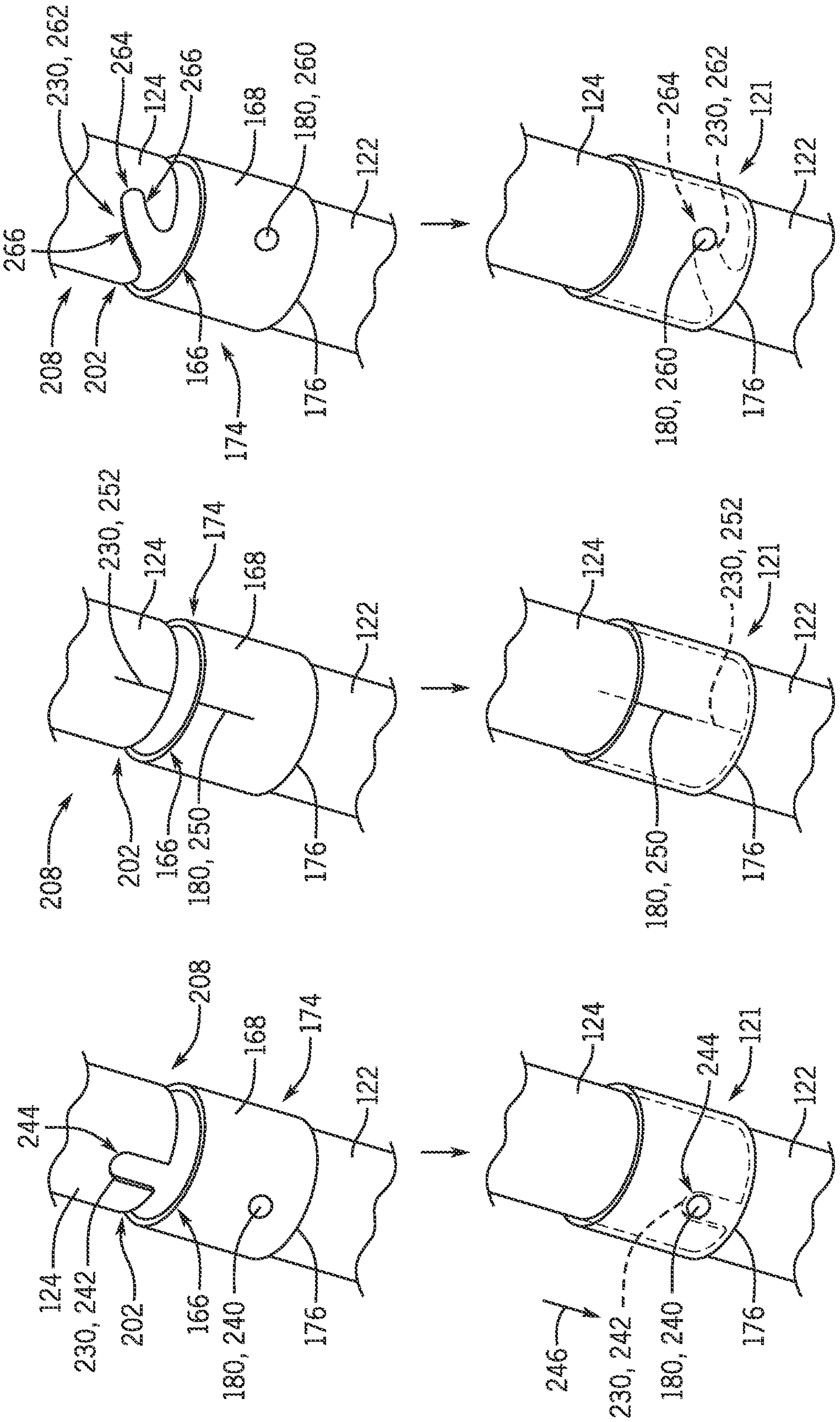
FIG. 11A is a perspective view of an embodiment of a tube joint of a suction tube that may be used in a heat exchanger system, in accordance with aspects of the present disclosure.
FIG. 11B is a perspective view of an embodiment of a tube joint of a suction tube that may be used in a heat exchanger system, in accordance with aspects of the present disclosure.
FIG. 11C is a perspective view of an embodiment of a tube joint of a suction tube that may be used in a heat exchanger system, in accordance with aspects of the present disclosure.

FIGS. 11A, 11B, and 11C are perspective views of embodiments of the tube joint 121. For example, FIG. 11A is an embodiment of the tube joint 121 in which the alignment feature 180 of the first tube segment 122 is a protrusion 240 (e.g., dimple, key, obstruction), and the alignment feature 230 of the second tube segment 124 is a notch 242 (e.g., slot, recess, cavity) configured to engage with the protrusion 240 of the first tube segment 122. In certain embodiments, the protrusion 240 may extend in a radially inward direction toward the interior passage 162 of the first tube segment 122 to engage with the notch 242 of the second tube segment 124. For example, as noted above, the first tube segment 122 may be configured to receive the second tube segment 124 via the collar 168. Accordingly, because the second tube segment 124 is inserted into the first tube segment 122, the protrusion 240 may extend inwardly toward the second tube segment 124 in an assembled configuration of the suction tube 120.

Upon aligning the protrusion 240 with the notch 242, the first tube segment 122 and the second tube segment 124 may be coupled to one another via brazing to form the tube joint 121. Notably, by aligning the protrusion 240 with the notch 242, the seventh portion 220 of the second tube segment 124 may be properly aligned with an opening (e.g., the opening 142) of the tubing access panel 138. In certain embodiments, the notch 242 may include a limiting surface 244 configured to engage with the protrusion 180 of the first tube segment 122 and limit movement of the second tube segment 124 relative to the first tube segment 122 in a direction 246 (e.g., an upstream direction relative to a direction of working fluid through the suction tube 120). For example, upon aligning the notch 242 of the second tube segment 124 with the protrusion 240 of the first tube segment 122, as the second tube segment 124 is received by the first tube segment 122, the protrusion may engage with the limiting surface 244 of the notch 242 such that the second tube segment 124 is blocked from traveling beyond the protrusion 240 in the direction 246. In certain embodiments, the protrusion 240 may engage with the limiting surface 244 of the notch 242 prior to the first end 202 of the second tube segment 124 engaging with the surface 176 of the collar 168. It should be appreciated that while the notch 242 is illustrated as a U-shaped notch, the notch 242 may take on any other geometries that enable the notch 242 to interact with and/or engage with the protrusion 240. For example, the notch 242 may be a V-shaped notch, a groove, or any other configuration that enables the notch 242 to receive the protrusion 240.

FIG. 11B is an embodiment of the tube joint 121 in which the alignment feature 180 of the first tube segment 122 is a marking 250 (e.g., engraving, visual indicator, stamp, band, layer, score), and the alignment feature 208 of the second tube segment 124 is also a marking 252 (e.g., engraving, visual indicator, stamp, band, layer, score) configured to align with the marking 250 of the first tube segment 122. In the illustrated embodiment, the marking 250 of the first tube segment 122 is disposed on an outer surface of the collar 168 of the first tube segment 122. However, in other embodiments, the marking 250 may be disposed in any suitable location that enables an operator or manufacturer to align the marking 250 with the marking 252 of the second tube segment 124.

Upon aligning the marking 250 with the marking 252, the first tube segment 122 and the second tube segment 124 may be coupled (e.g., mechanically secured via brazing, welding, fitting) to one another to generate the tube joint 121. Notably, by aligning the marking 250 with the marking 252 prior to mechanically securing the first tube segment 122 and the second tube segment 124 to one another, an orientation (e.g., a target orientation, target alignment) of the seventh portion 220 of the second tube segment 124 may be more reliably established (e.g., controlled) during assembly of the tube joint 121. For example, by verifying (e.g., visually verifying, physically verifying) alignment of the alignment feature 180 of the first tube segment 122 with the alignment feature 230 of the second tube segment 124 prior to mechanical securement of the first tube segment 122 and the second tube segment 124 to one another, an orientation (e.g., target orientation) of the seventh portion 220 of the second tube segment 124 relative to an opening (e.g., the opening 142) of the tubing access panel 138 may be more reliably established (e.g., more readily controllable).

In certain embodiments, the markings 250, 252 may be made using any suitable ink that enables an operator and/or manufacturer to identify the markings 250, 252. Additionally, or alternatively, the markings 250, 252 may correspond to engravings that are etched and/or machined onto the first and second tube segments 122, 124 respectively. In still other embodiments, certain features of the tube joint of FIG. 11A may be utilized by the tube joint 121 of FIG. 11B to facilitate proper alignment of the seventh portion 220 of the second tube segment 124 with an opening (e.g., opening 142) of the tubing access panel 138. For example, in certain embodiments, the first tube segment 122 may include the protrusion 240 extending radially inward toward the second tube segment 124, and the protrusion may be configured to engage with the marking 252 of the second tube segment 124. For example, the marking 252 may be an engraving configured to receive the protrusion 240. Further, while the markings 250, 252 are illustrated as lines in FIG. 11B, in other embodiments, the markings 250, 252 may take on any suitable shape (e.g., an "X", a circle, a square, an arrowhead) that enables an operator to align the alignment feature 180 of the first tube segment 122 with the alignment feature 230 of the second tube segment 124.

FIG. 11C is an embodiment of the tube joint 121 in which the alignment feature 180 of the first tube segment 122 is a pin 260 (e.g., dimple, key, obstruction, protrusion), and the alignment feature 108 of the second tube segment 124 is a slot 262 (e.g., notch, cutout, recess) configured to interact with (e.g., engage with) the pin 260 of the first tube segment 122. In certain embodiments, the pin 260 may be similar to the protrusion 240 discussed above with respect to FIG. 11A. For example, the pin 260 may extend in a radially inward direction toward the interior passage 162 of the first tube segment 122. In this way, the pin 260 may engage with the slot 262 defined by the first end 202 of the second tube segment 124 (e.g., due to the second tube segment 124 being inserted into the collar 168 of the first tube segment 122), as described in greater detail below.

For example, in certain embodiments, the slot 262 may include an apex 264 and one or more guiding surfaces 266. During assembly of the tube joint 121 illustrated in FIG. 11C, as the first tube segment 122 receives the second tube segment 124, the pin 260 may engage with one or more of the guiding surfaces 266. For example, the second tube segment 124 may be rotated relative to the first tube segment 122 such that the pin 260 of the first tube segment 122 engages with the guiding surfaces 266 of the slot 262 of the second tube segment 124. As the pin 260 engages with the guiding surfaces 266, the guiding surfaces 266 may force the pin 260 toward the apex 264 of the slot 262. Upon aligning the pin 260 with the apex 264 of the slot 262, the first tube segment 122 and the second tube segment 124 may be coupled to one another via mechanical securement (e.g., brazing, welding, fitting) to the generate the tube joint 121. Notably, by aligning the pin 260 with the apex 264 of the slot 262 and by verifying (e.g., visually verifying, physically verifying) alignment of the pin 260 with the apex 264 prior to mechanical securement of the first tube segment 122 and the second tube segment 124 to one another, an orientation (e.g., target orientation) of the seventh portion 220 of the second tube segment 124 relative to an opening (e.g., opening 142) of the tubing access panel 138 may be more reliably established (e.g., more readily controllable), as discussed above.

It should be appreciated that while the discussion above focuses on embodiments in which the first tube segment 122 receives the second tube segment 124, in other embodiments, the second tube segment 124 may be sized to receive the first tube segment 122. In such embodiments, the second tube segment 124 may include the alignment feature 180 described above as being associated with the first tube segment 122, and the first tube segment 122 may include the alignment feature 208 described above as being associated with the second tube segment 124. That is, the examples above are not intended to be limiting, and in certain embodiments, features associated with the first tube segment 122 may be utilized by the second tube segment 124 and features associated with the second tube segment 124 may be utilized by the first tube segment 122 to facilitate alignment of the first tube segment 122 with the second tube segment 124 and/or to facilitate alignment of the second tube segment 124 with the tubing access panel 138.

Figure 12:
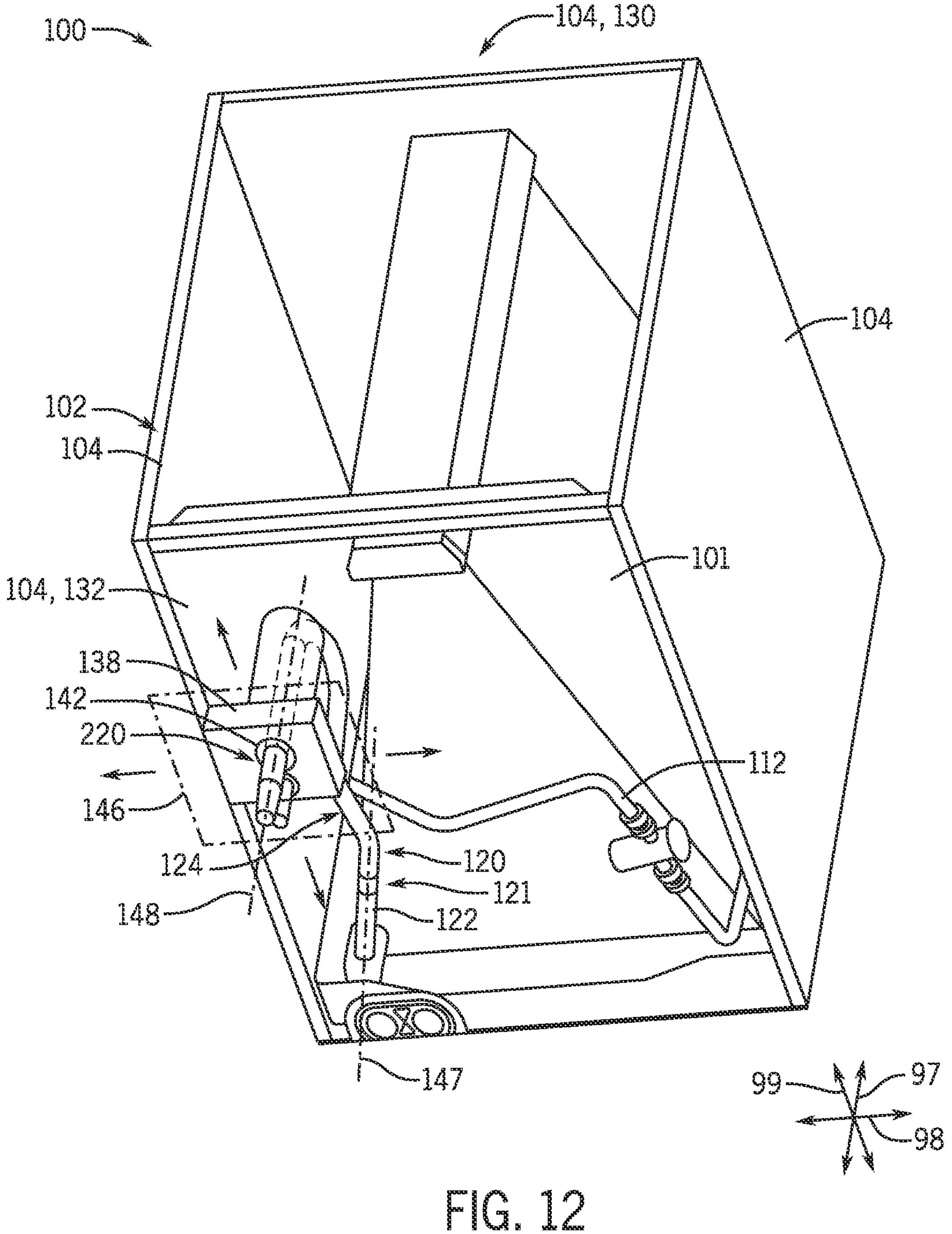
FIG. 12 is a perspective view of an embodiment of a heat exchanger system, illustrating an aligned orientation of a tubing access panel and a suction tube of the heat exchanger system, in accordance with aspects of the present disclosure.

FIG. 12 is a perspective view of an embodiment of the heat exchanger system 100 of FIG. 5 illustrating a proper alignment (e.g., target orientation, target alignment) between the suction tube 120 and the tubing access panel 138 of the heat exchanger system 100. In the illustrated embodiment, the panel 134 is removed from the front side 132 of the housing 102 to illustrate interior components of the heat exchanger system 100 (e.g., heat exchanger 101, conduit 112, suction tube 120, tube joint 121), but the tubing access panel 138 is shown in an installed orientation or location. As noted above, the tubing access panel 138 may extend along the plane 146, and in certain embodiments, the plane 146 may extend along the lateral axis 98 and the vertical axis 99 in an assembled configuration of the heat exchanger system 100.

As discussed above, the tube joint 121 between the first tube segment 122 and the second tube segment 124 of the suction tube 120 may be configured to facilitate proper alignment of the second tube segment 124 (e.g., seventh portion 220 of the second tube segment 124) with the tubing access panel 138. For example, by utilizing the tube joint 121 discussed above, the seventh portion 220 of the second tube segment 124 may extend through the opening 142 along the axis 148 that extends substantially crosswise (e.g., substantially perpendicularly) to the plane 146 along which the tubing access panel 138 extends. That is, during assembly of the heat exchanger system 100, the second tube segment 124 may be adjusted (e.g., rotated) about an axis 147 along which the first tube segment 122 extends in an installed configuration of the first tube segment 122. The second tube segment 124 may be adjusted until the alignment feature 230 of the second tube segment 124 aligns with the alignment feature 180 of the first tube segment 122. In doing so, a target orientation (e.g., target alignment, orientation in which the seventh portion 220 of the second tube segment 124 extends through the opening 142 along the axis 148, orientation in which the seventh portion 220 of the second tube segment 124 extends through the opening 142 along a central axis of the opening 142, orientation in which the seventh portion 220 of the second tube segment 124 extends through the opening 142 such that the axis 148 is coaxial with a central axis through the opening 142) may be achieved. In certain embodiments, the axis 148 may extend along the longitudinal axis 97, such that the seventh portion 220 of the second tube segment 124 extends in a direction (e.g., horizontal direction) along the longitudinal axis 97 in an assembled configuration of the heat exchanger system 100. Further, in certain embodiments, the axis 148 may extend normal (e.g., perpendicular) to the plane 146. Indeed, by utilizing the tube joint 121 (e.g., by utilizing the alignment features 180, 230 of the first and second tube segments 122, 124, respectively, to form the tube joint 121), a proper alignment and/or proper orientation of the suction tube 120 relative to the tubing access panel 138 may be achieved.

As set forth above, the present disclosure may provide one or more technical effects useful in manufacturing and/or assembling HVAC systems. Embodiments of the present disclosure may include a heat exchanger system having a specialized tube joint configured to facilitate alignment of a suction tube of the heat exchanger system with a tubing access panel through which the suction tube may extend. For example, the suction tubes discussed herein may include separate tubing segments that each have an alignment feature configured facilitate alignment of the tubing segments with one another. Upon aligning the alignment features of each of the respective tubing segments, the tubing segments may be coupled to one another via brazing, thereby ensuring a proper alignment of a free end of the suction tube that extends through the tubing access panel. In this way, costs associated with the manufacture and/or assembly of HVAC systems employing the specialized tube joint may be reduced. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the disclosure, or those unrelated to enabling the claimed disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A heating, ventilation, and air conditioning (HVAC) system, comprising:

a compressor configured to pressurize a working fluid and direct the working fluid through a vapor compression circuit; and a heat exchanger disposed along the vapor compression circuit, wherein the heat exchanger comprises:

a suction tube configured to receive the working fluid from the heat exchanger and direct the working fluid toward the compressor, wherein the suction tube comprises:

a first tube segment comprising a first end and a second end, wherein the first end is configured to fluidly couple to the heat exchanger, and the second end comprises a first alignment feature; and a second tube segment comprising an additional first end and an additional second end, wherein the additional first end comprises a second alignment feature configured to align with the first alignment feature of the first tube segment to establish a target orientation of the second tube segment relative to the first tube segment.

2. The HVAC system of claim 1, wherein the heat exchanger comprises a housing comprising a plurality of sides, a first side of the plurality of sides comprises a tubing access panel comprising an opening configured to receive the suction tube, and the second tube segment extends through and is aligned with the opening of the tubing access panel in the target orientation of the second tube segment.

3. The HVAC system of claim 2, wherein the target orientation is an angular orientation of the second tube segment relative to the first tube segment, and wherein the target orientation corresponds to a target alignment of the additional second end of the second tube segment relative to the opening of the tubing access panel.

4. The HVAC system of claim 1, wherein the second end of the first tube segment and the additional first end of the second tube segment are configured to couple to one another via a brazed tube joint.

5. The HVAC system of claim 4, wherein the brazed tube joint is configured to limit rotation of the first tube segment and the second tube segment relative to one another.

6. The HVAC system of claim 1, wherein the second tube segment comprises a plurality of portions successively extending from the additional first end to the additional second end of the second tube segment, wherein the plurality of portions comprises one or more straight portions and one or more bent portions.

7. The HVAC system of claim 6, wherein the first tube segment comprises a collar configured to receive a first portion of the plurality of portions, and wherein the first portion comprises the additional first end of the second tube segment.

8. The HVAC system of claim 7, wherein the collar comprises a first diameter, the first portion of the second tube segment comprises a second diameter, and the first diameter is greater than the second diameter.

9. The HVAC system of claim 8, wherein the collar comprises a limiting surface configured to limit movement of the second tube segment relative to the first tube segment in an upstream direction relative to a flow direction of working fluid through the suction tube.

10. The HVAC system of claim 1, wherein the first alignment feature is a protrusion and the second alignment feature is a notch.

11. The HVAC system of claim 10, wherein the first tube segment comprises a collar configured to least partially define an interior passage of the first tube segment, the collar is configured receive a portion of the second tube segment having the notch, and the protrusion is positioned on the collar and extends from the collar in a radial inward direction toward the interior passage and toward the portion of the second tube segment to engage with the notch.

12. The HVAC system of claim 11, wherein the notch comprises a limiting surface configured to limit movement of the second tube segment relative to the first tube segment via engagement of the protrusion with the limiting surface of the notch.

13. The HVAC system of claim 1, wherein the tubing access panel extends along a plane, and a portion of the second tube segment extends through the opening of the tubing access panel along an axis in the target orientation.

14. The HVAC system of claim 13, wherein the axis extends substantially perpendicularly to the plane.

* * * * *